United States Patent [19]

Tucker

[11] Patent Number: 4,533,083

[45] Date of Patent: Aug. 6, 1985

[54] DRIP FEED DEVICE FOR IRRIGATION PURPOSES

[75] Inventor: Alfred D. Tucker, Adelaide, Australia

[73] Assignee: RIS Irrigation Systems Pty. Ltd., Elizabeth, Australia

[21] Appl. No.: 474,675

[22] PCT Filed: Jun. 21, 1982

[86] PCT No.: PCT/AU82/00099
§ 371 Date: Feb. 7, 1983
§ 102(e) Date: Feb. 7, 1983

[87] PCT Pub. No.: WO83/00003
PCT Pub. Date: Jan. 6, 1983

[30] Foreign Application Priority Data

Jun. 22, 1981 [AU] Australia .............. PE9385

[51] Int. Cl.³ .................................. B05B 1/02
[52] U.S. Cl. ................... 239/542; 239/547; 138/42
[58] Field of Search ............. 239/542, 547; 138/42, 138/43; 285/331, 355, 390

[56] References Cited

U.S. PATENT DOCUMENTS

| 2,437,933 | 3/1948 | Brennan | 285/331 |
|---|---|---|---|
| 2,447,697 | 8/1948 | Gotschall | 285/331 |
| 2,511,733 | 6/1950 | Morrison | 138/43 |
| 3,520,561 | 7/1970 | Rininger | 285/390 |
| 3,767,124 | 10/1973 | Spencer | 239/542 |
| 3,873,030 | 3/1975 | Barragan | 239/542 |
| 3,885,743 | 5/1975 | Wake | 239/542 |
| 3,998,391 | 12/1976 | Lemelstrich | 239/542 |
| 3,998,427 | 12/1976 | Bentley | 239/542 |
| 4,215,822 | 8/1980 | Mehoudar | 239/542 |

FOREIGN PATENT DOCUMENTS

| 503042 | 2/1977 | Australia | 239/542 |
|---|---|---|---|
| 2815628 | 10/1978 | Fed. Rep. of Germany | 239/542 |

*Primary Examiner*—Andres Kashnikow
*Assistant Examiner*—James R. Moon, Jr.
*Attorney, Agent, or Firm*—Gordon L. Peterson

[57] ABSTRACT

A drip feed device for irrigation purposes comprising a body having an inlet on one side and an annular wall on the other, engaged by a cup having an outlet on one side and an annular wall on the other, to engage the annular wall on the body and housing in a chamber formed between them a button having circular flow paths on each side with flow-restricting baffles which overlap in the flow paths to give counter direction flow around the baffles.

14 Claims, 4 Drawing Figures

DRIP FEED DEVICE FOR IRRIGATION PURPOSES

This invention relates to a drip feed device for irrigation purposes and in particular it relates to devices of a type which can be inserted in a line to allow a drip or a steady restricted flow from water within the line to the area being watered, the term "drip feed" herein including restricted steady flow.

Many forms of drip feed devices are already known, most of these using a body within which is a member having an elongated groove of spiral, helical or similar form through which water flows from within the carrying tube to flow out at the other end at a pressure so reduced that only a trickle of water flows from the device.

It is already known to use in such devices a button having on each side a circular flow path with means to feed into the flow path on one side and along the flow path and through a medial wall in the button to the other side and then along the flow path to discharge from the device, the restriction being obtained by having in the flow path a series of oppositely projecting veins whereby to substantially elongate the path and provide turbulence to the flow by successive changes of direction to break down the pressure between the starting end and the discharge end.

An object of the present invention is to provide a device of this general type with certain improvements, the first improvement being to provide within the device a button having improved flow constricting means, a second object being to provide a satisfactory housing for such a button which will allow the button to be readily removed for cleaning, and a third object is to so arrange the flow path that there is a minimum problem of blockages when the water passing through the device carries solid impurities.

The invention generally comprises a drip feed device for irrigation purposes in which a body has a cylindrical wall closed at one end by a transverse first wall having on it an inlet for fluids, and a cap fitted to the body having a cylindrical wall and across it an intermediate transverse second wall parallel to the first wall and having through it an outlet aperture, the body and the cap forming between them a closed chamber communicating on one side with the said inlet and on the other side with the outlet aperture, in which chamber is housed a circular flow constricting button having flow-restricting channels on each side of it connected in series between the inlet and the outlet aperture of the said chamber and having inwardly projecting flow-restricting baffles and outwardly projecting flow-restricting baffles extending into the flow-control channels, the chamber being bounded on the outside by the cylindrical wall of the cap and the said button having the inwardly projecting flow-restricting baffles overlap the ends of the outwardly projecting flow-restricting baffles whereby flow is in counterdirection around the ends of both the inwardly flow-restricting baffles and the outwardly projecting flow-restricting baffles.

According to a preferred form the invention comprises a device for irrigation purposes wherein a body has a cylindrical wall member having one end closed by a first transverse wall provided with an inlet for fluids, and fitted to the body a cap having a cylindrical wall arranged to sealingly engage the inside of the cylindrical wall of the body and having across it an intermediate transverse second wall parallel to the first wall and having through it an outlet aperture to allow outflow of fluids, the wall of the cap and the first wall and the second wall defining between them a chamber in which is housed a flow-control button which fits neatly into the chamber and has a perimeter wall which sealingly engages the first wall and the second wall when the cap is moved down over the cylindrical wall of the body, the button having a division wall intermediate the ends of the perimeter wall and narrower than the perimeter wall to form spaces for fluids between the first wall and the division wall and the second wall and the division wall, and a secondary generally cylindrical inner wall at the centre part of the division wall having the free edges sealingly engaging respectively the first wall and the second wall to form an inlet space on one side of the division wall opening to the inlet on the body and to form an outlet space on the other side of the division wall opening to the outlet in the cap, the space between the outer wall and the secondary inner wall forming a flow-restricting channel on each side of the button, the flow-restricting channels communicating with the inlet and outlet spaces through ducts, one wall of which extends between the said perimeter wall and the said inner wall to define one end of that flow-restricting channel, an aperture joining the two flow channels at the other end of the two channels, the outer perimeter wall having a series of spaced flow-diverting baffles projecting inwardly toward the inner wall, the inner wall having outwardly projecting flow-diverting baffles extending to between the inwardly projecting baffles so as to overlap and preferably having enlarged ends disposed between the inwardly directed baffles whereby to cause counter-flow around the ends of the baffles to restrict flow first in the flow-restricting channel on one side of the division wall and then in the flow-restricting channel on the other side of the division wall.

In order that the invention will be fully appreciated an embodiment will now be described with reference to the accompanying drawings in which.

Figure 1:
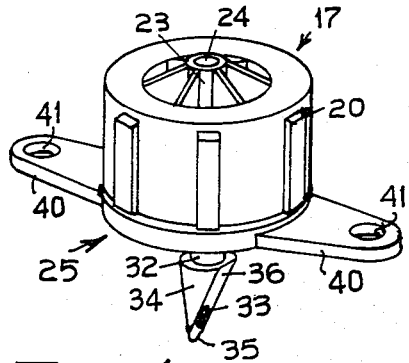
FIG. 1 is a perspective view of such a drip feed device.
Figure 2:
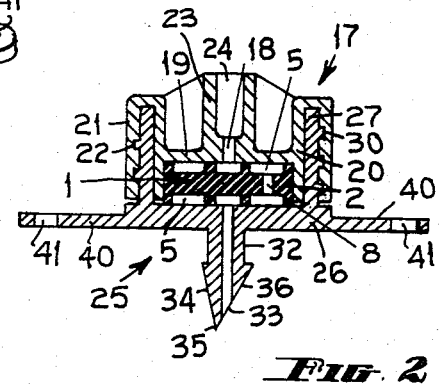
FIG. 2 is a central transverse section of same.
Figure 3:
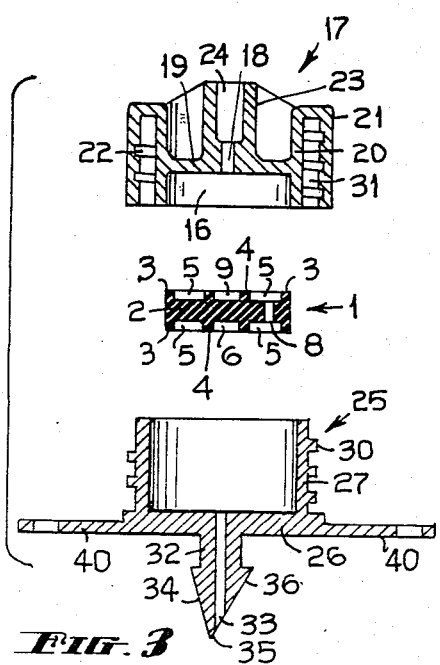
FIG. 3 is a view similar to FIG. 2 but showing the components separated.

The button 1 is of circular form with a central division wall 2 between a cylindrical outer wall 3, and an inner generally cylindrical wall 4 so that the inner wall 4 together with the outer cylindrical wall 3 form between them on each side of the division wall 2 a generally circular flow-restricting channel 5. The flow-restricting channel 5 on each side is similar and starts within the space 6 and continues through a duct 7 into the circular flow path 5 on that side. The division wall 2 has an aperture 8 through it near the outer wall at the end of the flow path 5 on that side to communicate with the start of the flow path on the other side, the flow path on the other side terminating in the space 9 (similar to the space 6) defined by the inner cylindrical wall 4 on that side of the division wall.

Positioned to project into the flow-restricting channels 5 on each side of the division wall 2 are a series of staggered flow-restricting baffles, one series of these baffles projecting inwardly from the outer wall 3 of the button in a radial direction, which baffles are designated 10, another set of flow-restricter baffles 11 projecting outwardly from the inner wall 4 of the button to have the ends of these baffles 11 terminating in spaces 12, which are each positioned between a pair of the baffles 10 projecting from the cylindrical outer wall 3. The baffles 11 have enlarged ends 13 to increase turbulence and form added restricters in the channel 5 on each side of the button 1.

Figure 4:
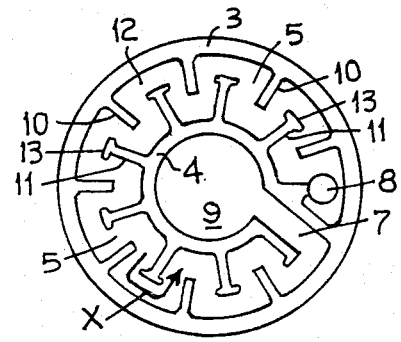
FIG. 4 is an enlarged plan view of the button showing how the baffles are positioned to form the restricting path.

It will be seen that the length of the inner restricter baffles 11, that is those baffles 11 which extend out from the inner wall 4 and have the expanded ends 13, is such that they project well into the spaces 12 formed between two adjacent outer baffles 10 which extend inward from the cylindrical outer wall 3 so that the channel 5 is arranged to give substantial turbulence where the water flows past the expanded ends 13 of the inner flow-restricter baffles 10 into the space 12 between two outer flow-restricter baffles 10 and then out of that space into the flow path between the next set of restricter baffles and so on. Thus the inner baffles 11 direct flow outwards into the spaces 12 and flow is then reversed around the other side of the baffles 11, giving counter-flow around both the outer baffles 10 and the inner baffles 11. The arrow X in FIG. 4 shows the counter-flow.

Such a flow-restricter button 1 is positioned in a recess 16 in a cap 17 which has a central outlet aperture 18 communicating with the central space 9 of the button 1, the outlet aperture 18 being formed in a transverse wall 19 which extends to a first cylindrical wall 20 at its perimeter which extends outwardly at the top to join a further downwardly projecting cylindrical wall 21 parallel to the inner cylindrical wall 20 but spaced therefrom and provided with internal screw threads 22 whereby the cap 17 can be coupled to a body.

The cap 17 has an extension 23 having a socket 24 into which a tube can be inserted if it is required to discharge water to a position remote from the cap 17.

The body 25, which carries the cap 17 comprises a transverse wall 26 which is parallel to the transverse wall 19 of the button 1 and on this wall is a cylindrical upwardly projecting wall 27 which is arranged to engage the cylindrical wall 21 of the cap and has on its outer surface a thread 30 to engage the screw thread 22 on the cap 17 so that when the cap 17 is screwed down on to the body, the button 1 is held firmly between the first transverse wall 19 and the second transverse wall 26 to be held firmly therebetween without the possibility of leakage around the button from the inlet to a controlled outlet. It will be seen that the walls 20 and 21 on the cap form between them a cylindrical space 31 which neatly houses the cylindrical wall 27 of the body 25, resulting in a form of generally leakproof construction.

The wall 20 and/or the wall 27 can be tapered at their interface to form an interference fit therebetween which increases as the cap 17 is screwed down on the body 25.

The body 25 has a projecting inlet member 32 which is in the form of a spear having a hollow 33. The inlet member projects from wall 26 of the body on the axial line of the button, and the hollow 33 of this communicates with the space 6 at the centre of the button 1 on one side of the division wall 2 of the button, whereby when the device is fixed to a fluid-carrying conduit, by pushing the spear through the wall of the conduit, water flows through the hollow 33 into the space 6 which communicates through the duct 7 with the start of the flow-restricting channel 5 on that side of the button 1 to flow through the aperture 8 to the flow-restricting channel 5 on the other side of the button through a duct 7 on that side of the button to the space 9 and then through the outlet 18.

As previously stated, the inlet member 32 is spear-shaped and has a piercing head 34 which is disposed axially to bring the hollow 33 out remotely of the point 35, the head having a flat 36 to further facilitate protection of the hollow 33 during piercing. It also allows intake up or down stream by appropriate orientation of the device.

Because the button 1 fits between the transverse wall 19 of the cap and the parallel transverse wall 26 of the body, and as the button has a peripheral outer cylindrical wall 3 which engages these walls, an effective seal is provided between the inlet member 32 and the outlet 18 as the cap 17 can be screwed down firmly on to the button 1 to force the button on to the transverse wall 26.

To hold the device firmly to the conduit or pipe, the body 25 has a pair of oppositely projecting lugs 40 which are apertured at 41 and so shaped that they can be tied down on to the conduit or pipe on each side of the inlet member 32, or they can themselves be shaped as ties which can be tied around the conduit or pipe or can be arranged to clip on to the conduit or pipe if that is preferred, the arrangement of the lugs being such that the device is firmly held down on to the conduit or pipe to ensure that it is not accidentally dislodged when in operation.

It will be realised from the foregoing that a unit is provided which can effectively carry a button type of flow-restricter 1 in a recess 16 formed between a cap 17 and a body 25 when the cap 17 is held down on the body 25, and leakage generally is avoided, and the arrangement ensures that water entering the inlet member 32 will follow the relatively long flow-restricting channels 5 generally circularly around the button first on one side and then on the other side but with the required elongation of the path being achieved by the inwardly and outwardly projecting restricter baffles 10 and 11 extending respectively from the cylindrical outer wall 3 of the button and the cylindrical inner wall 4 of the button with the restriction improved by having those baffles 11 which project outwardly from the inner cylindrical wall 4 of the button projecting well into the flow path 5 and defined between two co-operating buffers projecting inwardly from the cylindrical outer wall 3 so that an extended flow channel is formed.

Instead of having the cap 17 arranged to screw on to the body 25 it could, of course, be a click fit whereby the cap can simply be pushed down on to the body to lock thereto in a position where the chamber 16 formed between the cap 17 and the body 25 in which the button 1 is seated will isolate the button within it without leakage taking place either between the cap 17 and body 25 or between the two sides of the button. This ensures that the flow is in the flow-restricting channels 5 on one side of the button and out of the corresponding flow-restricting channel 5 on the other side of the button to the outlet 18 of the device.

The device described, because of the overlap of the baffles 10 and 11 ensures counter directional flow around the baffle ends to give effective flow resistance by induced turbulence, the chamber 16 being sealed in a leak-proof manner by the fit between the interengaging cylindrical walls 20 and 27 and the ability to screw the cap 17 down firmly on to the outer wall 3 of the button to seal it to the body 25. Also the device can be readily fitted to a fluid line by piercing the line to accommodate the inlet member (32).

The whole device is formed of a somewhat resilient plastics material to allow effective sealing.

I claim:

1. A drip feed device for irrigation purposes in which a body (25) has a cylindrical wall (27) closed at one end by a transverse first wall (26) having on it an inlet member (32) for fluids, and a cap (17) is fitted to the body (25) having a cylindrical wall (20) and across it an intermediate transverse second wall (19) parallel to the first wall (26) and having through it an outlet aperture (18), the said body (25) and the said cap (17) forming between them a closed chamber (16) communicating on one side with the said inlet membrane (32) and on the other side with the said outlet aperture (18), in which chamber (16) is a circular flow-restricting button (1) having flow-restricting channels (5) on each side of it connected in series between the said inlet member (32) and the said outlet aperture (18) of the said chamber (16), and having inwardly projecting flow-restricting baffles (10) and outwardly projecting flow-restricting baffles (11) extending into the said flow-restricting channels (5),
 characterised in that the said chamber is bounded on the outside by the said cylindrical wall (20) of the said cap (17) and the said button (1) has the inwardly projecting flow-restricting baffles (10) project into the space between and overlap the ends of the said outwardly projecting flow-restricting baffles (11) whereby flow is in counter direction around the ends of both the said inwardly flow-restricting baffles (10) and the said outwardly projecting flow-restricting baffles (11), and
 further characterised by the outwardly projecting flow-restricting baffles (11) having expanded ends (13) to increase resistance to flow in spaces (12) formed between the inwardly projecting flow-restricting baffles (10).

2. A drip feed device according to claim 1 further characterised by a second cylindrical outer wall (21) on the cap (17) outside of the said inner wall (20) with a space therebetween to receive the cylindrical wall (27) of the body (25), and interengaging screw threads (22 and 30) on the said outer cylindrical wall (21) and the cylindrical wall (27) on the said body (25), said cylindrical wall 20 and/or said cylindrical wall 27 tapering slightly at the interface to provide an interference fit to prevent leakage therebetween.

3. A drip feed device according to claim 1 further characterised by an extension (23) on the cap (17) having a socket (24) adapted to receive a tube to discharge fluid remotely of the cap (17).

4. A drip feed device according to claim 1 further characterised by a fluid inlet (32) which comprises a piercing head (34) having its point (35) offset from a hollow (33) of the inlet (32).

5. A drip feed device according to claim 4 further characterised by a flat (36) on the piercing head (34) through which the hollow (33) opens.

6. A drip feed device according to claim 1 further characterised by a second cylindrical outer wall (21) on the cap (17) outside of the said inner wall (20) with a space therebetween to accommodate the wall (27) with an interference fit, and interengaging screw threads (22 and 30) on the said outer cylindrical wall (21) and the cylindrical wall (27) on the said body (25), a fluid inlet (32) comprising a head (34) having its point (35) offset from the hollow (33) of the inlet (32), and an extension (23) on the cap (17) having a socket (24) adapted to receive a tube to discharge fluid remotely of the cap (17).

7. A drip feed device for irrigation purposes comprising:
 a body (25) having a cylindrical wall member (27) having one end closed by a transverse first wall (26) provided with an inlet (32) for fluids,
 a cap (17) fitted to the body (25) characterised by having a cylindrical wall (20) arranged to engage the inside of the cylindrical wall (30) of the body (25) and having across it an intermediate second transverse wall (19) parallel to the first transverse wall (26) and having through it an outlet aperture (18) to allow outflow of fluids, the wall (20) of the said cap (17) and the said first wall (26) of the said body (25) and the said second wall (19) of the said cap (17) defining between them a chamber (16) and
 a flow-control button (1) in the chamber (16) having a perimeter wall (3) adjacent the wall (20) of the cap, which button (1) sealingly engages the said first wall (26) and the said second wall (19) when the said cap (17) is urged down over the cylindrical wall (27) of the body, said button (1) having a transverse division wall (2) intermediate the ends of the chamber (16) and narrower than the chamber (16) to form spaces for fluids between the said first wall (26) and the division wall (2) and the said second wall (19) and the division wall (2), and a secondary generally cylindrical inner wall (4) at the center part of the division wall (2) having the free edges engaging respectively the said first transverse wall (26) and the said second transverse wall (19) to form an inlet space (6) on one side of the division wall (2) opening to the inlet (32) on the body (25) and to form an outlet space (9) on the other side of the division wall (2) opening to the outlet (18) in the said cap (17), the space between the outer wall (3) and the secondary inner wall (4) forming a flow-restricting channel (5) on each side of the division wall (2), the flow-restricting channels (5) communicating with the said inlet space (6) and the said outlet space (9) through ducts (7) one wall of which extends between the said perimeter wall (3) and the said inner wall (4) to define one end of the said flow-restricting channels (5), an aperture (8) in the button joining the two flow-restricting channels at the other end of the said flow channels (5), characterised further by the outer perimeter wall (3) having a series of spaced flow-diverting baffles (10) projecting inwardly toward the inner wall (4), the inner wall (4) having outwardly projecting flow-diverting baffles (11) extending to between the inwardly projecting baffles (10) and having the ends projecting into spaces disposed between the inwardly directed baffles (10) whereby to cause flow in reverse direction around the ends of the said baffles (10 and 11) to restrict flow by turbulence first in the flow-restricting channel (5) on one side of the division wall (2) and then in the flow-restricting channel (5) on the other side of the division wall (2), and at least some of said baffles having expanded ends.

8. A drip feed device according to claim 1 wherein said outwardly projecting flow-restricting baffles are generally T-shaped.

9. A drip feed device for irrigation purposes comprising:
- a body having a circumferentially extending wall and a transverse first wall closing said circumferential wall adjacent one end thereof, said body having an inlet member on said transverse first wall;
- a cap fitted to the body having a circumferential wall and an intermediate transverse second wall having an outlet aperture extending therethrough;
- said body and said cap forming between them a closed chamber communicating on one side with said inlet member and on the other side with said outlet aperture;
- a flow-restricting button in said chamber, said flow-restricting button having flow-restricting channels on each side of it connected in series between the inlet member and the outlet aperture and having circumferentially spaced inwardly projecting flow-restricting baffles and circumferentially spaced outwardly projecting flow-restricting baffles;
- at least some of said baffles having expanded ends; and
- the inwardly projecting flow-restricting baffles projecting inwardly into the spaces between the outwardly projecting flow-restricting baffles in at least one of said flow restricting channels.

10. A drip feed device according to claim 9 wherein said outwardly projecting flow-restricting baffles are generally T-shaped.

11. A drip feed device according to claim 10 wherein the inwardly projecting flow-restricting baffles have nonexpanded ends.

12. A drip feed device according to claim 9 wherein the expanded ends of said same baffles are the only expanded portions of said same baffles.

13. A drip feed device according to claim 9 wherein the button has an aperture therein for connecting said flow-restricting channels in series.

14. A drip feed device according to claim 9 wherein the outwardly projecting flow-restricting baffles have a main body portion, said expanded ends are joined to said main body portions, and said expanded ends extend in opposite directions from said main body portions.

* * * * *